(12) United States Patent
Olson et al.

(10) Patent No.: US 11,722,406 B2
(45) Date of Patent: Aug. 8, 2023

(54) ROUTE SELECTION BASED ON BUFFER CONGESTION

(71) Applicant: Hewlett Packard Enterprise Development LP, Houston, TX (US)

(72) Inventors: David Olson, Grapeland, TX (US); Darel Neal Emmot, Wellington, CO (US); Nicholas George McDonald, Fort Collins, CO (US); John Kim, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 90 days.

(21) Appl. No.: 17/247,473

(22) Filed: Dec. 11, 2020

(65) Prior Publication Data

US 2021/0258252 A1 Aug. 19, 2021

Related U.S. Application Data

(60) Provisional application No. 62/948,145, filed on Dec. 13, 2019.

(51) Int. Cl.
| | |
|---|---|
| *H04L 45/00* | (2022.01) |
| *H04L 45/24* | (2022.01) |
| *H04L 47/10* | (2022.01) |
| *H04L 47/52* | (2022.01) |
| *H04L 47/122* | (2022.01) |
| *H04L 45/42* | (2022.01) |

(52) U.S. Cl.
CPC .............. *H04L 45/38* (2013.01); *H04L 45/24* (2013.01); *H04L 45/42* (2013.01); *H04L 47/122* (2013.01); *H04L 47/29* (2013.01); *H04L 47/52* (2013.01)

(58) Field of Classification Search
CPC ......... H04L 45/24; H04L 45/38; H04L 45/42; H04L 47/122; H04L 47/29; H04L 47/52
See application file for complete search history.

(56) References Cited

U.S. PATENT DOCUMENTS

| | | | |
|---|---|---|---|
| 6,973,032 B1 * | 12/2005 | Casley ................ | H04L 47/263 370/413 |
| 8,885,657 B2 | 11/2014 | Atkinson et al. | |
| 9,397,961 B1 * | 7/2016 | Bailey ................. | H04L 49/901 |
| 9,608,938 B2 | 3/2017 | Venkatesan et al. | |
| 10,218,589 B1 * | 2/2019 | Matthews .............. | H04L 43/06 |
| 2007/0121499 A1 * | 5/2007 | Pal ......................... | H04L 45/60 370/417 |

(Continued)

OTHER PUBLICATIONS

Wang, P. et al.; "Adaptive Remaining Hop Count Flow Control: Consider the Interaction Between Packets"; Mar. 2015; 11 pages.

*Primary Examiner* — Jeong S Park
(74) *Attorney, Agent, or Firm* — Hewlett Packard Enterprise Patent Department (57) ABSTRACT

A switch includes a plurality of ingress ports, a plurality of egress ports, and a plurality of buffers comprising a buffer coupled to each ingress port, egress port pair. An ingress port is to determine a plurality of potential egress ports for a packet. The ingress port is to select an egress port of the plurality of potential egress ports based on congestion of the corresponding buffers coupled to the ingress port and to each of the plurality of potential egress ports. The ingress port is to place the packet into the corresponding buffer coupled to the ingress port and the selected egress port.

19 Claims, 4 Drawing Sheets

(56) References Cited

U.S. PATENT DOCUMENTS

| | | | |
|---|---|---|---|
| 2014/0119193 A1 | 5/2014 | Anand et al. | |
| 2017/0048144 A1* | 2/2017 | Liu | H04L 47/2441 |
| 2018/0183720 A1* | 6/2018 | Shpiner | H04L 47/39 |
| 2018/0316599 A1* | 11/2018 | McDonald | H04L 45/122 |
| 2019/0236038 A1* | 8/2019 | Choudhary | G06F 13/20 |
| 2020/0007432 A1* | 1/2020 | McDonald | H04L 45/123 |
| 2020/0371880 A1* | 11/2020 | Aibester | G06F 9/544 |

\* cited by examiner

ROUTE SELECTION BASED ON BUFFER CONGESTION

STATEMENT OF GOVERNMENT RIGHTS

This invention was made with Government support under Prime Contract No. DE-AC52-07NA27344 awarded by DOE. The Government has certain rights in this invention

BACKGROUND

Weighted arbitration may be used in a computer fabric to select routes based on biases intended to improve overall system behavior. For example, the hop count remaining on the path provided by a routing table may be used to select a route. Fewer remaining switch hops generally means that the packet will reach its final destination sooner. The congestion seen at each possible egress port based on available link credits may be used to select a route. Egress congestion reflects how many available credits the switch sees on an external link for a data packet should it be routed to said egress. Lower egress congestion generally indicates that a packet will go out onto the external link sooner.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
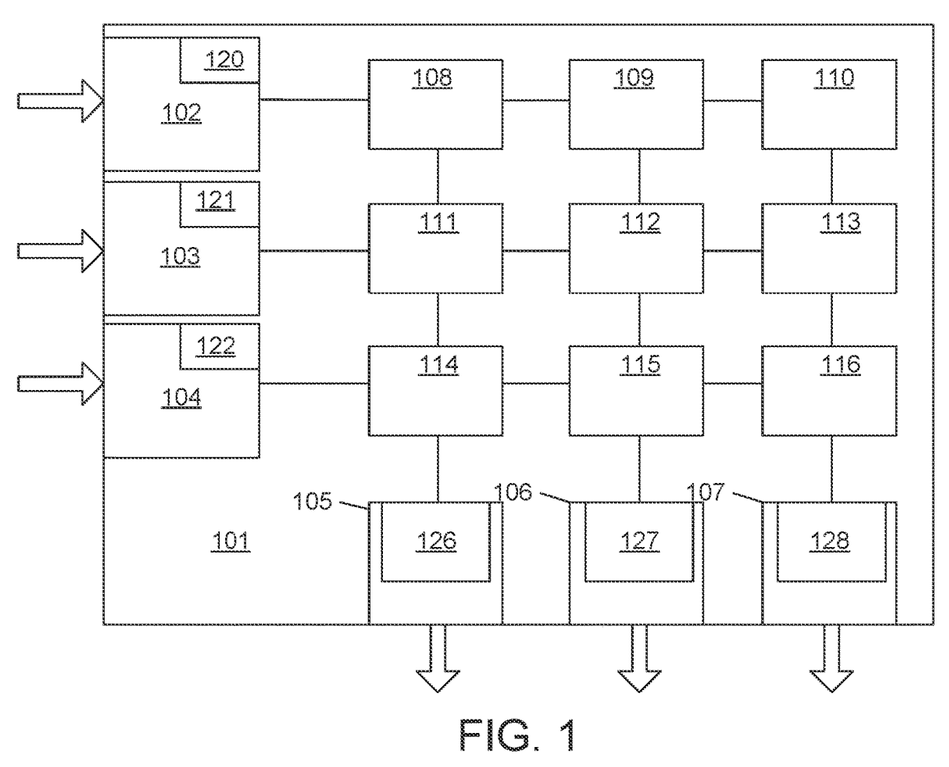
FIG. 1 illustrates an example switch.

FIG. 1 illustrates an example switch. The illustrated device may be implemented as an application specific integrated circuit (ASIC) implemented in hardware, as software stored on a non-transitory computer readable medium, or as a combination thereof. In various implementations, the switch 101 may be configured to operating in various protocol environments, such as a Gen-Z, an Ethernet, or InfiniBand.

The switch 101 includes a plurality of ingress ports 102, 103, 104 and a plurality of egress ports 105, 106, 107. While the illustrated example has 6 ports, the described technology may be applicable to switches having any number of ports. Additionally, in some implementations, the ports 102-107 may be bi-directional, such that a given port 102-107 may be able to operate as both an ingress port and an egress port. In these examples, each port includes the components described with respect to both ingress ports 102-104 and egress ports 105-107.

The switch 101 further comprises a plurality of buffers 108, 109, 110, 111, 112, 113, 114, 115, 116. The buffers 108-116 store packets received via the ingress ports while they await transmission over the egress ports. In this example, there is one buffer 108-116 for each ingress ports 102-103, egress port 105-107 pair. For ease of explanation, the buffers 108-116 are illustrated in a matrix. Each buffer corresponds to the ingress port aligned with its row and the egress port aligned with its column. For example, buffer 112 buffers packets received via ingress 103 that are to be transmitted via egress port 106.

In the illustrated example, the switch 101 is configured for dynamic routing, where a received packet may have multiple routes available through the fabric to its destination. The different routes correspond to different egress ports 105-107. Accordingly, when a packet is received at an ingress port, the switch determines the potential egress ports for the packet based on routing tables. The switch then selects a route and places the packet corresponding buffer communicatively coupled to the egress port corresponding to the selected route.

In the illustrated example, each ingress port 102, 103, 104 includes a corresponding routing table 120, 121, 122, respectively. The routing tables 120, 121, 122 list the potential egress ports for packets based on packet information, such as packet destination, quality of service (QoS) values, packet source, packet virtual channel, or other metadata. When an ingress port receives a packet, the port determines the potential egress ports for the received packet using its routing table.

When there are a plurality of potential egress ports, the ingress port selects an egress port from the plurality of potential egress ports based on congestion of the corresponding buffers coupled to the ingress port and to each of the plurality of potential egress ports. For example, if ingress port 102 receives a packet with two potential routes corresponding to egress ports 105 and 107, ingress port 102 uses the congestion at the buffers 108 and 110 in making its decision. For example, the buffer congestion information may comprise a measure of the available space left within the buffer. The ingress port then places the packet into the corresponding buffer coupled to it and the selected egress port. For example, if ingress port 102 selects egress port 105, it would place the packet into buffer 108.

Figure 3:
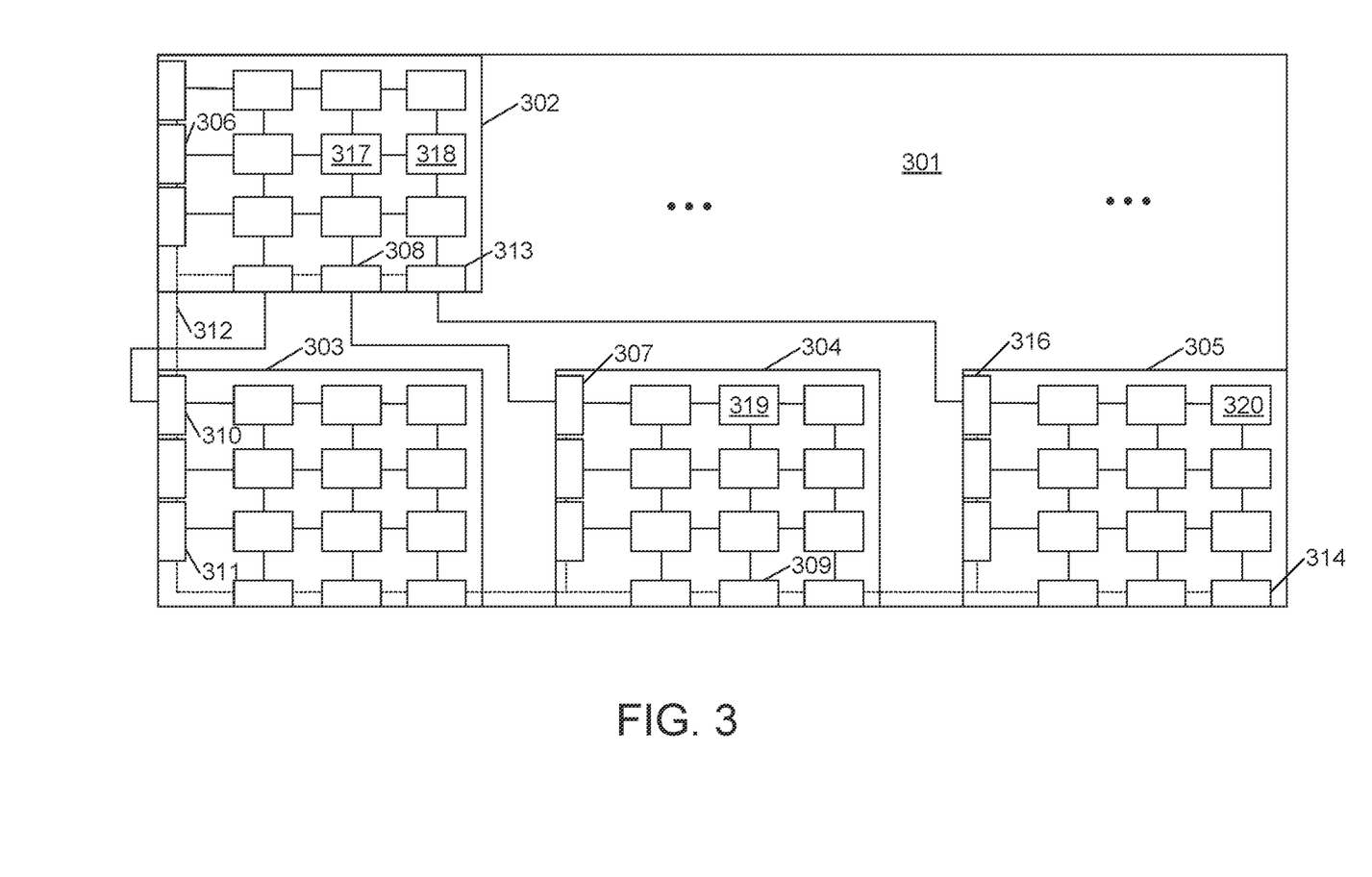
FIG. 3 illustrates an example hierarchal switch.

In some implementations, an ingress port 102-104 may report an indication of how many packets it can receive to upstream network devices or to upstream internal switch devices (see discussion of FIG. 3). For example, the ingress ports 102-104 may report available flow control credits upstream. These indications may be based on the highest buffer occupancy of its connected buffers. For example, if ingress port 102's buffer 110 were completely full, ingress port 102 would report that it could not accept packets, even if the other two buffers 108 and 109 were completely empty. By taking buffer congestion into account, the buffer occupancy may be more balanced than a situation where only external factors such as hop count and congestion were considered. Accordingly, an ingress port may be able to accept packets more frequently or report less congestion than it would otherwise be able.

In the illustrated example, each egress port 105-107 includes a corresponding arbiter 126, 127, 128 to select packets for transmission from one of its corresponding buffers. For example, egress port 105 selects packets from buffers 108, 111, and 114. In various examples, the arbiters 126-128 may employ various forms of arbitration to select which packet to send such as age-based arbitration or round robin arbitration. The egress ports 105-107 are configured to transmit their selected packets over the links to which they are connected.

Figure 2:
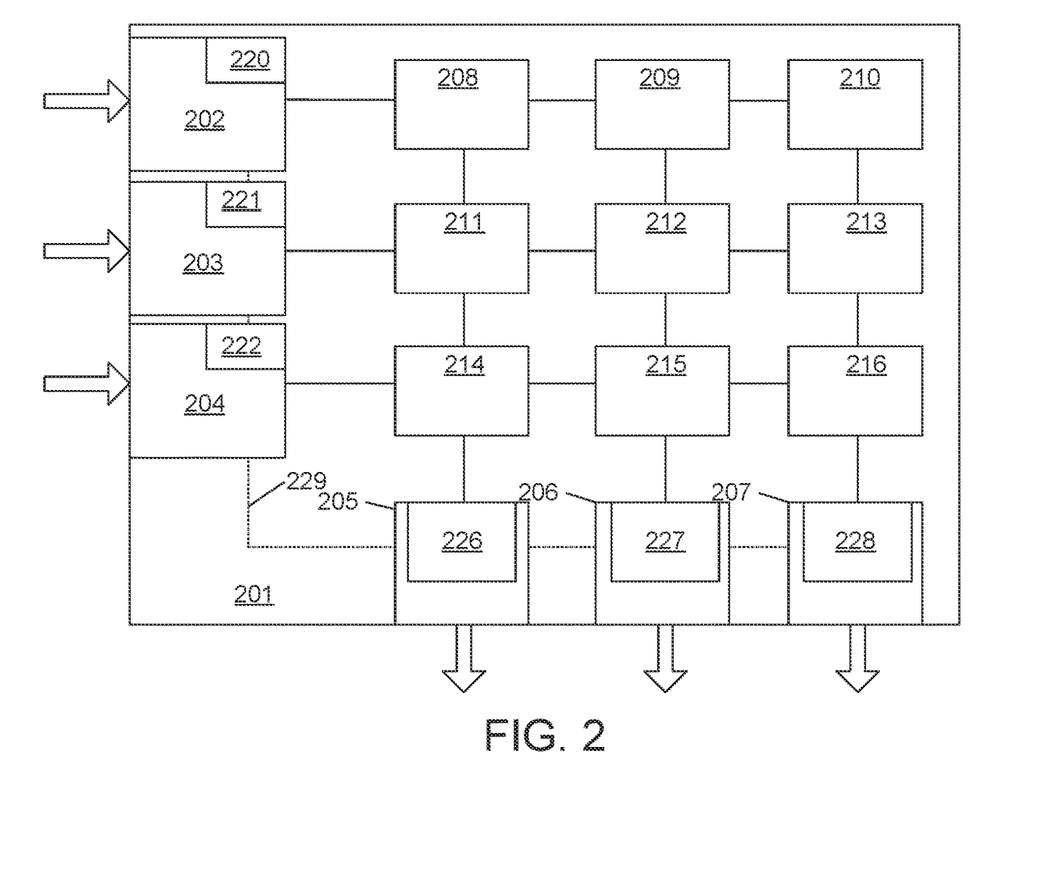
FIG. 2 illustrates a second example switch.

FIG. 2 illustrates a second example switch. For example, the switch 201 may be an implementation of a switch 101 as described with respect to FIG. 1.

In this example, the switch 201 includes a plurality of ingress ports 202, 203, 204 and a plurality of egress ports 205, 206, 207. As discussed with respect to FIG. 1, in various implementations, the switch 201 may be have any number of ports. Additionally, in some implementations, the ports 202-207 may be bi-directional, such that a given port 202-207 may be able to operate as both an ingress port and an egress port.

The switch 201 further comprises a plurality of buffers 208, 209, 210, 211, 212, 213, 214, 215, 216. The buffers 208-216 store packets received via the ingress ports while they await transmission over the egress ports. In this example, there is one buffer 208-216 for each ingress ports 202-203, egress port 205-207 pair. For ease of explanation, the buffers 208-216 are illustrated in a matrix. Each buffer corresponds to the ingress port aligned with its row and the egress port aligned with its column. For example, buffer 212 buffers packets received via ingress 203 that are to be transmitted via egress port 206.

In the illustrated example, the switch 201 is configured for dynamic routing, where a received packet may have multiple routes available through the fabric to its destination. The different routes correspond to different egress ports 205-207. Accordingly, when a packet is received at an ingress port, the switch determines the potential egress ports for the packet based on routing tables. The switch then selects a route and places the packet corresponding buffer communicatively coupled to the egress port corresponding to the selected route.

In the illustrated example, each ingress port 202, 203, 204 includes a corresponding routing table 220, 221, 222, respectively. The routing tables 220, 221, 222 list the potential egress ports for packets based on packet information, such as packet destination, quality of service (QoS) values, packet source, packet virtual channel, or other metadata. When an ingress port receives a packet, the port determines the potential egress ports for the received packet using its routing table.

When there are a plurality of potential egress ports, the ingress port selects an egress port from the plurality of potential egress ports based on congestion of the corresponding buffers coupled to the ingress port and to each of the plurality of potential egress ports. For example, if ingress port 202 receives a packet with two potential routes corresponding to egress ports 205 and 207, ingress port 202 uses the congestion at the buffers 208 and 210 in making its decision. For example, the buffer congestion information may comprise a measure of the available space left within the buffer.

In some implementations, each ingress port 202-204 assigns a buffer congestion weight to each of the potential egress ports based on the congestion of the corresponding buffers. In some implementations, if the buffer for a potential egress port has more than a threshold occupancy, the ingress port assigns a set weight to the buffer. For example, if the threshold is set to x available buffer entries, an ingress port would assign the buffer congestion weight value to each buffer having less than x available entries. Buffers having x or more available entries are not assigned a buffer congestion weight value, or the weight value is set to 0 in these cases. In various implementations, the threshold and the buffer congestion weight may be a configurable number. For example, control/status registers (CSRs) may be used to set the threshold and the buffer congestion weights. In some examples, the ingress ports 202-204 may use the same threshold values or buffer congestion weight values. In other examples, the ingress ports 202-204 may be programmed with different threshold values or buffer congestion weight values. Additionally, ingress ports may use different values based on different conditions, such as the virtual channel (VC) on which a packet will be sent.

In various implementations, a switch may take other factors into account in addition to buffer congestion when determining which buffer to place received packets. In this example, the ingress ports perform a selection method to select a buffer for a packet that includes route characteristics and dynamic route conditions as well was buffer congestion in determining which buffer and egress port to select. For example, the ingress ports may assign a route weight to each of the potential egress ports based on network routes corresponding to the potential egress ports.

For example, the route characteristics may be stored in the routing tables 220-222. For example, a route characteristic may be a hop count for each route. In some implementations, the hop count may be normalized to a certain number of bits. For example, the hop count (HC) may be stored as a 0 for minimal routes (routes where the next hop is the destination) and 1 for non-minimal routes (routes with more than one hop to the destination). In these examples, the ingress port assigns a route weight to each of the potential egresses based on whether or not the corresponding route is minimal. For example, the ingress ports may assign a bias weight to non-minimal routes. In some implementations, the non-minimal bias may be set using CSRs. In further implementations, different non-minimal biases may be assigned based on various packet-related factors. For example, the particular non-minimal bias may be assigned as a function of the VC assigned to the packet.

In other examples, the total hop count may be mapped onto a longer bit string (such as two or three bits), or a sufficient number of bits to store the exact hop count may be provisioned in the routing tables. In these examples, biases may be calculated based on the total hop count information. For example, a lookup table may be used to determine a bias based on the route hop count.

In some examples, a switch may also take dynamic route congestion into account when selecting a buffer. In the illustrated example, the switch 201 is configured for credit-based flow control on the network. The switch 201 includes an internal network 229 to allow the egress ports 205-207 to report their currently available credits to the ingress ports 202-204. Ingress ports 202-204 assign an egress congestion weight to each of the potential egress ports based on the available credits for transmission on the selected route.

The ingress ports 202-204 combine the buffer congestion weights, the route weights, and the egress congestions weights for each of the potential egress ports to form a combined weight and select the egress ports having a minimal combined weight. In one implementation, an ingress port 202-204 assigns a combined weight to each potential egress port 205-207 as follows:

1) If the HC=1 (i.e., the route is non-minimal), Option Weight i=Congestion i+Non-minimal bias weight+buffer congestion weight;

2) If the HC=0 (i.e., the route is minimal), Option Weight i=Congestion i+buffer congestion weight.

As discussed above, in some cases, the buffer congestion weight for the option is set to 0 if the corresponding buffer occupancy is less than a threshold level and set to a programmable value if the buffer occupancy is over the threshold level. In other cases, there may be different buffer congestion weights based on different threshold levels, for example 0 for less than a first threshold, a first weight for less than a second threshold, and a second weight for greater than the second threshold. In such examples, the values for the multiple thresholds and the values for the weights may be configurable. Other implementations may apply further methods of assigning the buffer congestion weights. For example, the buffer congestion weight values may be set based on the VC of the packet, the age of the packet, or other packet metadata.

FIG. 3 illustrates an example hierarchal switch 301. Switch 301 comprises a plurality of switch ASICs 302, 303, 304, 305 ("switchlets"), with each switch ASIC 302-305 implemented as an internal switch within the switch device 301 described with respect to FIG. 1 or FIG. 2. The switchlets are connected in an internal network topology. Accordingly, in this example, the ports of a switch ASIC may be internal ports or external ports. Internal ports connect to other internal ports—for example, internal egress port 308 of switchlet 302 is connected to internal ingress port 307 of switchlet 304. External ports connect to the external network—for example, external ingress port 206 may be connected to a network to receive packets and external egress port 309 may be connected to the network to transmit packets. In some implementations, the switchlets of an example switch 301 may have all internal ingress or egress ports—for example, switchlet 304 has all internal ingress ports 307 and switchlet 302 has all internal egress ports 308. In other implementations, some or all of the switchlets of a switch 301 may have mixed internal and external ports. For example, switchlet 303 comprises an internal ingress port 303 and external ingress ports 311.

In examples where a potential egress port is not an external egress port, an ingress port may assign the egress congestion weights based on the available credits at the external egress port associated with the potential route. For example, the switch 302 may include an interconnect 312, such as a bus or ring network to enable each egress port 309, 308 of each switchlet 301 to broadcasts its available credits to the ingress ports 306, 310, 311, 307. As an example, if a packet is received at external ingress port 306, and its routing table (not illustrated) indicates potential routes corresponding to external egress ports 309 and 314, then its potential egress ports and buffers are 308 and 317, and 313 and 318, respectively. The ingress port 306 may use the available credits at the external egress ports 309 and 314 to determine whether to select buffer 317 or 318, respectively.

In some implementations, an ingress port of a switchlet 302-305 may take into account the buffer congestion on other switchlets as well. For example, an interconnect (not pictured) may be provided to broadcast the buffer congestion levels throughout the switch 301. In such examples, ingress ports may assign downstream buffer congestion weights to potential routes based on the congestion levels on the buffer congestion levels on the other switchlets along the potential routes. For example, ingress port 306 may assign weights to potential egress ports 308 and 313 based on the buffer congestion levels of buffers 319 and 320, respectively. In some implementations, the downstream buffer congestion weights may be assigned in a similar manner to the internal buffer congestion weights as described above. In other implementations, the downstream congestion weights may be assigned in a different manner. For example, an occupancy threshold value may be lower or higher for a downstream buffer, or the weight value assigned may be lower or higher for a downstream buffer.

Figure 4:
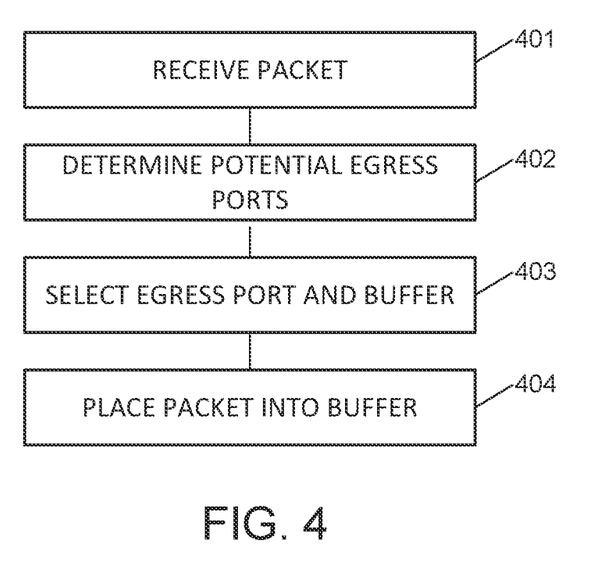
FIG. 4 illustrates a method of switch operation.

FIG. 4 illustrates a method of switch operation. For example, the illustrated method may be performed by a switch as described with respect to FIGS. 1-3.

The method includes block 401. Block 401 includes receiving a packet. For example, block 401 may comprise receiving a packet at an external ingress port of a switch or at an internal ingress port of a hierarchical switch.

The method includes block 402. Block 402 includes determining a plurality of potential egress ports for the packet. For example, block 402 may include an ingress port using a routing table to determine the potential egress ports that correspond to the available routes for the packet.

The method includes block 403. Block 403 includes selecting an egress port of the plurality of potential egress ports based on congestion of corresponding buffers coupled to each of the plurality of potential egress ports. For example, block 403 may comprise assigning a buffer congestion weight to each of the potential egress ports based on the congestion of the corresponding buffers and selecting the egress port based on the assigned buffer congestion weights. In some cases, if a buffer corresponding to a potential egress port has more than a threshold amount of congestion, the potential egress port is assigned the buffer congestion weight. If the buffer has less than the threshold amount of congestion, the buffer congestion weight is 0 (or the potential egress port is not assigned a buffer congestion weight). In other cases, multiple thresholds associated with different buffer congestion weights may be applied.

In some examples, block 403 may include assigning a route weight to each of the potential egress ports based on the network routes corresponding to the potential egress ports. For example, the route weights may be assigned based on the route hop counts. As discussed above, in one example, potential egress ports associated with non-minimal routes are assigned the weight as a bias weight while minimal routes are not assigned a bias weight.

Block 403 may also include assigning an egress congestion weight to each of the potential egress ports. As discussed above, the egress weights may be based on the available credits at the external egress port for the route. In some cases, the potential egress port directly coupled to the buffer is the external egress port (for example, in FIG. 1 or 2), or the external egress port may be a downstream egress port communicatively coupled to the potential egress port.

Block 403 may further include combining the buffer congestion weights, the route weights, and the egress congestions weights for each of the potential egress ports to form a combined weight and selecting the egress port having a minimal combined weight.

The method further includes block 404. Block 404 includes the ingress port placing the received packet into the buffer for the egress port selected in block 403. Block 404 may further include the egress port retrieving the packet and transmitting the packet. In some cases, the selected egress port is an external egress port and transmitting the packet comprises transmitting the packet over an external network link. In other cases, the selected egress port is an internal egress port and transmitting the packet comprises transmitting the packet internally to an internal ingress port of a next switchlet.

Figure 5:
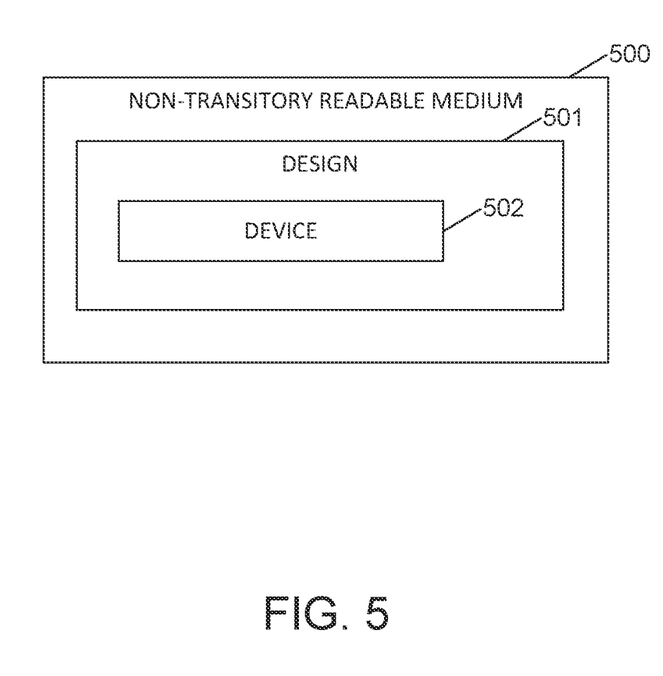
FIG. 5 illustrates an example non-transitory computer readable medium storing a design for a hardware implementation for a device as described with respect to FIGS. 1-3

FIG. 5 illustrates an example non-transitory computer readable medium 500 storing a design for a hardware implementation for a device as described with respect to FIGS. 1-3. For example, the medium 500 may comprise computer storage or memory, or a portable computer readable storage. The design 501 may be for a portion or block of an integrated circuit (IC), an IC in its entirety, or a device comprise multiple ICs. The design 501 may be stored in various formats. For example, the design 501 may comprise a synthesizable register transfer level (RTL) block design, gate-level netlist, or a transistor layout.

The design may be for a device 502 as described with respect to FIGS. 1-3. For example, the design may include designs for a plurality of ingress ports, a plurality of egress ports, and a plurality of buffers comprising a buffer coupled to each ingress port, egress port pair. The device design may be configured such that an ingress port is to determine a plurality of potential egress ports for a packet, select an egress port of the plurality of potential egress ports based on congestion of the corresponding buffers coupled to the ingress port and to each of the plurality of potential egress ports, and place the packet into the corresponding buffer coupled to the ingress port and the selected egress port.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A first switch comprising:
   a plurality of ingress ports;
   a plurality of egress ports; and
   a plurality of buffers, wherein a respective buffer of the plurality of buffers is dedicated for a corresponding ingress port and egress port pair comprising an ingress port of the plurality of ingress ports and an egress port of the plurality of egress ports;
   wherein the first switch is to:
      identify a plurality of potential egress ports for a packet received at a first ingress port of the plurality of ingress ports;
      assign buffer congestion weights to the plurality of potential egress ports, wherein each respective buffer congestion weight of the buffer congestion weights is based on:
         a respective congestion level of a respective buffer dedicated for the first ingress port and a corresponding potential egress port of the plurality of potential egress ports, and
         a congestion level of a buffer in a second switch downstream of the first switch, where the second switch is in a route that includes the corresponding potential egress port;
      select a first egress port for the packet from the plurality of potential egress ports based on the buffer congestion weights assigned to the plurality of potential egress ports, and
   wherein the first ingress port is to place the packet into a first buffer dedicated for an ingress port and egress port pair including the first ingress port and the first egress port.

2. The first switch of claim 1, further comprising:
   a switch application specific integrated circuit (ASIC) that includes the plurality of ingress ports, the plurality of egress ports, and the plurality of buffers.

3. The first switch of claim 1, wherein the plurality of buffers are to store packets received via the plurality of ingress ports while the packets await transmission over the plurality of egress ports.

4. The first switch of claim 1, wherein the first switch is to:
   assign route weights to the plurality of potential egress ports based on respective network routes corresponding to the plurality of potential egress ports;
   assign egress congestion weights to the plurality of potential egress ports,
   wherein the selecting of the first egress port is further based on the route weights assigned to the plurality of potential egress ports and the egress congestion weights assigned to the plurality of potential egress ports.

5. The first switch of claim 4, wherein a respective egress congestion weight of the egress congestion weights is based on an available credit at a respective potential egress port of the plurality of potential egress ports.

6. The first switch of claim 4, wherein the first switch is to:
   combine a corresponding route weight of the route weights, a corresponding egress congestion weight of the egress congestion weights, and a corresponding buffer congestion weight of the buffer congestion weights for each corresponding potential egress port of the plurality of potential egress ports, to generate respective combined weights for the plurality of potential egress ports,
   wherein the selecting of the first egress port is based on a comparison of the combined weights.

7. The first switch of claim 4, wherein the first switch is to receive an indication of how many packets each ingress port of a plurality of ingress ports of the second switch is able to receive, wherein the egress congestion weights are based on the indications received for the plurality of ingress ports of the second switch.

8. The first switch of claim 1, wherein the first switch is to assign a corresponding buffer congestion weight to each of the plurality of potential egress ports that has a corresponding buffer in the first switch with more than a threshold level of congestion.

9. A method, comprising:
   receiving a packet at a first ingress port of a first switch, wherein the first switch includes a plurality of ingress ports, a plurality of egress ports, and a plurality of buffers, wherein a respective buffer of the plurality of buffers is dedicated for a corresponding ingress port and egress port pair comprising an ingress port of the plurality of ingress ports and an egress port of the plurality of egress ports;
   identifying, by the first switch, a plurality of potential egress ports for the packet;
   assigning, by the first switch, buffer congestion weights to the plurality of potential egress ports, wherein each respective buffer congestion weight of the buffer congestion weights is based on:
      a respective congestion level of a respective buffer dedicated for the first ingress port and a corresponding potential egress port of the plurality of potential egress ports, and
      a congestion level of a buffer in a second switch downstream of the first switch, where the second switch is in a route that includes the corresponding potential egress port;
   selecting a first egress port for the packet from the plurality of potential egress ports based on the buffer congestion weights assigned to the plurality of potential egress ports; and
   placing the packet into a first buffer dedicated for an ingress port and egress port pair including the first ingress port and the first egress port.

10. The method of claim 9, wherein the plurality of buffers are to store packets received via the plurality of ingress ports while the packets await transmission over the plurality of egress ports.

11. The method of claim 9, further comprising:
assigning route weights to the plurality of potential egress ports based on respective network routes corresponding to the plurality of potential egress ports; and
generating a corresponding combined weight by combining a corresponding buffer congestion weight of the buffer congestion weights and a corresponding route weight of the route weights for each of the plurality of potential egress ports, to generate combined weights,
wherein the selecting of the first egress port is based on the combined weights.

12. The method of claim 11, further comprising:
assigning link congestion weights to the plurality of potential egress ports,
wherein the generating of the corresponding combined weight comprises combining the corresponding buffer congestion weight, the corresponding route weight, and a corresponding link congestion weight of the link congestion weights for each of the plurality of potential egress ports.

13. The method of claim 12, wherein a link congestion weight of the link congestion weights is based on an available credit at a respective potential egress port of the plurality of potential egress ports.

14. The method of claim 12, wherein a link congestion weight of the link congestion weights is based on an available credit at a corresponding external port communicatively coupled to a respective potential egress port of the plurality of potential egress ports.

15. The method of claim 9, wherein the assigning a corresponding buffer congestion weight of the buffer congestion weights is to each of the plurality of potential egress ports that has a corresponding buffer with more than a threshold level of congestion.

16. A non-transitory computer readable medium storing comprising instructions that upon execution cause a first switch to:
receive a packet at a first ingress port of the first switch, wherein the first switch includes a plurality of ingress ports, a plurality of egress ports, and a plurality of buffers, wherein a respective buffer of the plurality of buffers is dedicated for a corresponding ingress port and egress port pair comprising an ingress port of the plurality of ingress ports and an egress port of the plurality of egress ports;
identify a plurality of potential egress ports for the packet;
assign buffer congestion weights to the plurality of potential egress ports, wherein each respective buffer congestion weight of the buffer congestion weights is based on:
a respective congestion level of a respective buffer dedicated for the first ingress port and a corresponding potential egress port of the plurality of potential egress ports, and
a congestion level of a buffer in a second switch downstream of the first switch, where the second switch is in a route that includes the corresponding potential egress port;
select a first egress port for the packet from the plurality of potential egress ports based on the buffer congestion weights assigned to the plurality of potential egress ports; and
place the packet into a first buffer dedicated for an ingress port and egress port pair including the first ingress port and the first egress port.

17. The non-transitory computer readable medium of claim 16, wherein the plurality of buffers are to store packets received via the plurality of ingress ports while the packets await transmission over the plurality of egress ports.

18. The non-transitory computer readable medium of claim 16, wherein the instructions upon execution cause the first switch to:
assign route weights to the plurality of potential egress ports based on respective network routes corresponding to the plurality of potential egress ports;
assigning egress congestion weights to the plurality of potential egress ports;
combining a corresponding buffer congestion weight of the buffer congestion weights, a corresponding route weight of the route weights, and a corresponding egress congestions weight of the egress congestion weights for each of the plurality of potential egress ports, to generate combined weights,
wherein the selecting of the first egress port is based on the combined weights.

19. The non-transitory computer readable medium of claim 18, wherein the selecting of the first egress port is based on comparing the combined weights.

* * * * *